Nov. 1, 1955 T. M. BALL 2,722,206
AUTOMATIC CARBURETOR CONTROL
Filed Aug. 3, 1953 4 Sheets-Sheet 1

INVENTOR.
Thomas M. Ball
BY
Harness and Harris
ATTORNEYS

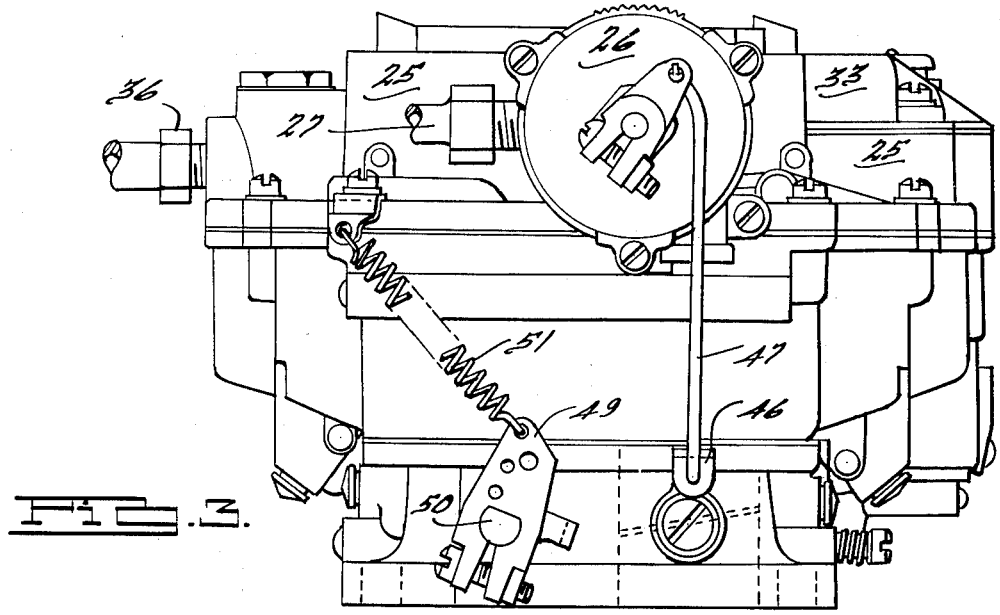
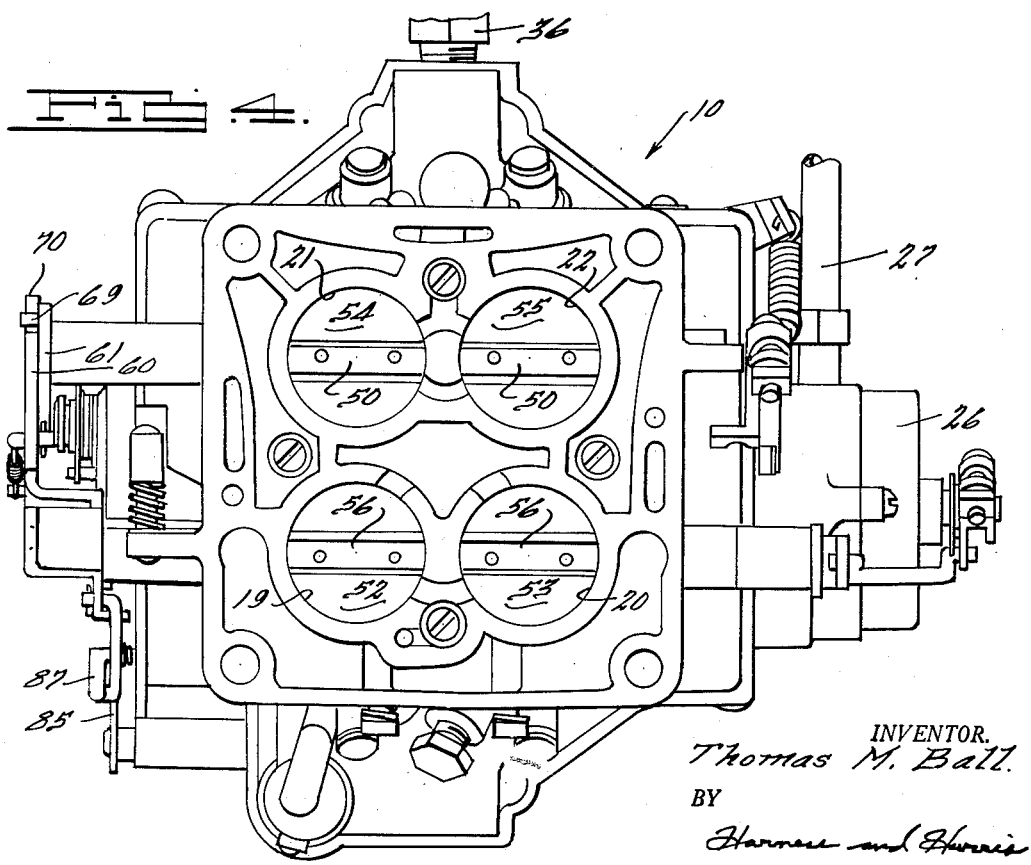

Nov. 1, 1955

T. M. BALL 2,722,206

AUTOMATIC CARBURETOR CONTROL

Filed Aug. 3, 1953

INVENTOR.
Thomas M. Ball
BY
*Harness and Harris*
ATTORNEYS

Nov. 1, 1955 T. M. BALL 2,722,206
AUTOMATIC CARBURETOR CONTROL
Filed Aug. 3, 1953 4 Sheets-Sheet 4

INVENTOR.
Thomas M. Ball.
BY
ATTORNEYS

United States Patent Office 2,722,206
Patented Nov. 1, 1955

2,722,206

AUTOMATIC CARBURETOR CONTROL

Thomas M. Ball, Bloomfield Hills, Mich., assignor to Chrysler Corporation, Highland Park, Mich., a corporation of Delaware Application August 3, 1953, Serial No. 371,945

13 Claims. (Cl. 123—127)

This invention relates to liquid cooled internal combustion engines and to liquid fuel carburetors of the two-stage type and to twin liquid fuel carburetors for use on liquid cooled internal combustion engines. More particularly, this invention relates to a means for controlling the operation of the second stage of the two-stage carburetor or the second carburetor of a twin carburetor engine.

When a particular installation calls for the use of an internal combustion engine having a wide range of operating speeds, it is desirable to either provide the engine carburetor with a second auxiliary stage or else provide the engine with a second auxiliary carburetor in order to produce a sufficient intake capacity while the engine is operating under high speeds. However, when the engine is operating in the lower speed range it is necessary to render the second carburetor or the second carburetor stage inoperative in order to maintain optimum engine performance at the lower speeds.

Accordingly, a primary object of the present invention is to provide a means which is responsive to engine speed for controlling the operation of the second stage of a two-stage carburetor so that the second stage will be inoperative at lower engine speeds and operative at higher engine speeds.

A more specific object of the present invention is to provide a means which is responsive to engine coolant pump pressure to automatically control the second stage of a two-stage carburetor whereby the second stage is rendered operative at speeds above a predetermined maximum value and at a predetermined throttle position.

Another object of the present invention is to provide a means which is responsive to engine speed to control the operation of a second auxiliary carburetor on an internal combustion engine so that the same will be rendered operative only during predetermined operating conditions.

In general, the embodiment of the invention herein disclosed is adapted to be used with any available type of four-barrel carburetor. The four barrels are adapted to be operated in pairs of two, each pair having a corresponding pair of throttle valves for controlling the intake manifold charge. The throttle valves of each pair are mounted upon a common shaft and are adapted to operate in tandem. An appropriate form of throttle linkage is provided for actuating a first pair of throttle valves, which will be hereinafter referred to as the primary throttle.

The shaft upon which the primary throttle is mounted is linked to a control member which is rotatably mounted upon another throttle shaft carrying a second pair of throttle valves. This second pair of throttle valves will be hereinafter referred to as the secondary throttle.

Another control member is fixedly secured to the secondary throttle shaft and is linked to a flexible diaphragm in a coolant pressure actuator device. Conduit means are provided for conducting coolant pump pressure from an engine driven pump to the actuator device to actuate a movable diaphragm therein.

A lost motion connection is provided between the first and the second control members on the secondary throttle shaft which is effective to prevent the diaphragm in the actuator device from actuating the second control member to vary the position of the secondary throttle from a closed position until the primary throttle approaches the wide open position. As the wide open position is approached, the first control member on the secondary throttle shaft is caused to rotate thereby releasing the lost motion connection with the second control member. If the engine speed is then sufficiently great, the engine coolant pump pressure will cause the diaphragm to deflect thus moving the secondary throttle to the open position.

In order to obtain efficient carburetion, the flow rates for the intake manifold air should be maintained within optimum limits. If only the primary throttle is operative at the higher engine speeds where a high intake air flow rate is required, the upper optimum limit will be exceeded thereby causing the engine output torque to "fall off." When the secondary throttle is functioning, the flow rate through any single carburetor throat is reduced to a value which is within the optimum operating range.

On the other hand, if both carburetor stages are operating during low speed engine operation, the air flow rate through any single carburetor throat will fall below the lower optimum limit which will in turn cause the engine output torque to "fall off."

It is thus seen that the present invention is effective to maintain a high engine torque throughout the entire operating speed range of the engine by selectively controlling the carburetor throttle valves to obtain the most effective carburetion at all speeds.

For the purpose of more particularly describing the present embodiment of the invention, reference will hereinafter be made to the accompanying drawings wherein:

Figure 3 is a side view of the four-barrel carburetor of Figure 2;

Figure 4 is a bottom view of the four-barrel carburetor of Figure 2 showing the throttle valve;

Figure 1:
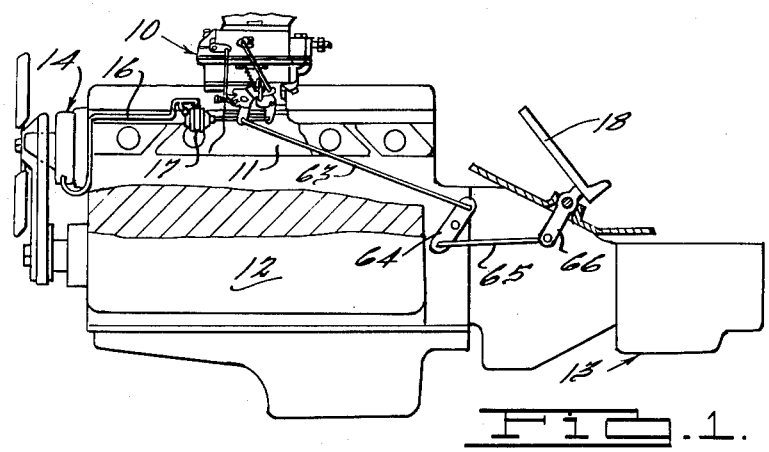
Figure 1 is a plan view of a four-barrel carburetor mounted upon an automatic vehicle engine together with a suitable throttle linkage mechanism.

A four-barrel carburetor is shown generally at 10 in Figure 1 and is mounted upon an intake manifold 11 of an internal combustion engine shown generally at 12. The engine 12 is provided with a suitable power transmission 13 on the rear end thereof and a belt driven water pump on the forward end which is generally shown at 14. A suitable water pump pressure conduit is shown at 16 leading from the engine water pump 14 and a pressure actuator device 17.

A foot throttle 18 is provided in the usual manner in the interior of the vehicle. The throttle linkage and the throttle valve control mechanism will be described in the following paragraphs with reference particularly to Figures 5 through 8.

Figure 2:
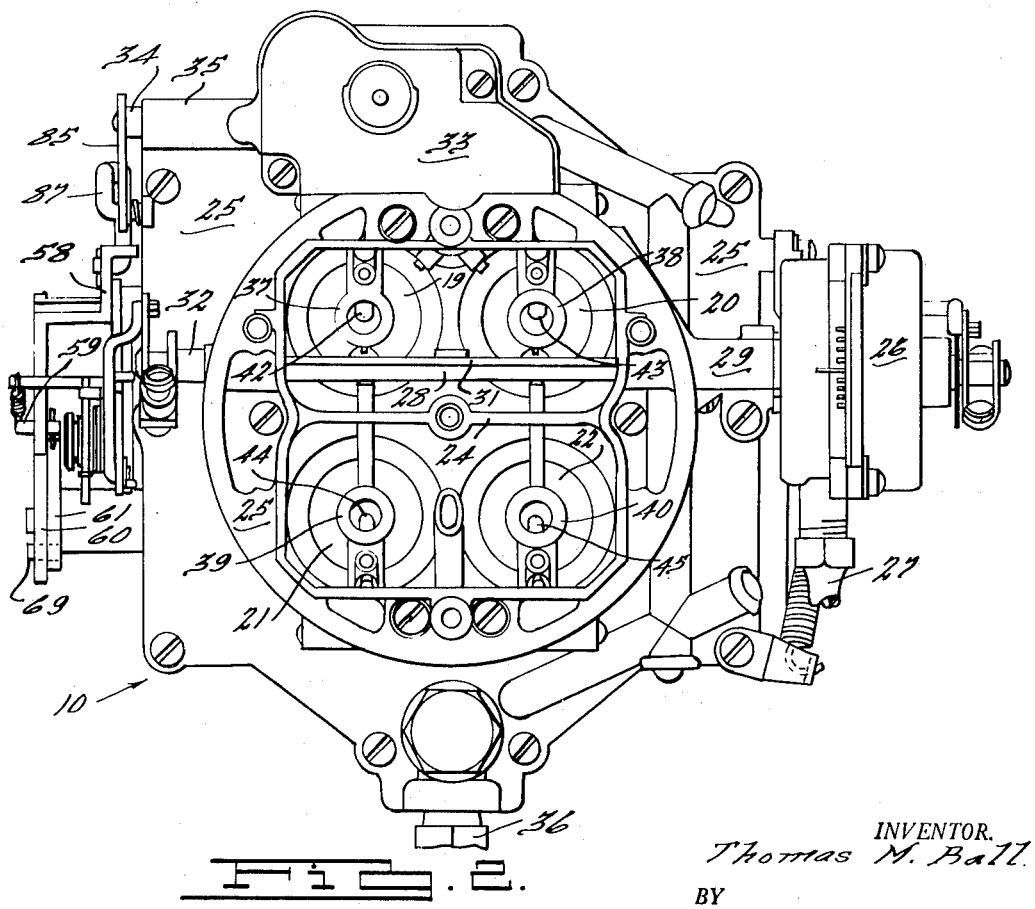
Figure 2 is a top view of a four-barrel carburetor showing some of the component elements thereof.

As seen in Figure 2, the carburetor includes four barrels which are separately identified by numerals 19, 20, 21, and 22. The four barrels are divided into pairs of two by a vertically extending wall 24, the latter being joined at either end to the carburetor casting which is designated by numeral 25. The barrels 19 and 20 are grouped together on one side of wall 24 and the barrels 21 and 22 are grouped into a separate pair on the opposite side of wall 24. It will be seen from the following description that the pair of barrels 19 and 20 are associated with the primary throttle valves and the pair of barrels 21 and 22 are associated with the secondary throttle valves.

An automatic choke control is shown generally at 26 and is adapted to receive exhaust manifold air through the fitting 27. A shaft 28 extends from the choke device 26 through a suitable mounting portion 29 on the casting 25 into the space above the barrels 19 and 20 and is adapted to be rotatably adjusted by the choke device 26. A choke valve 31 is secured to the shaft 28 and is adapted to provide a choking action when the shaft 28 is rotated. The choke valve 31 is shown in the fully open position in Figure 2. The shaft 28 has an extension shown at 32 which carries linkage elements for causing the shaft 28 to move a slight amount when the primary throttle valve reaches the wide open position.

The carburetor metering jets and accelerator pump boosting mechanism are housed in a portion of the casting 25 shown at 33. Suitable linkage elements are provided for positively connecting the throttle linkage mechanism with a shaft 34 which is rotatably mounted in a portion 35 of the casting 25 and which is effective to control the elements within portion 33.

A fuel inlet fitting is seen at 36 through which liquid fuel is admitted to a fuel bowl, not shown. A Venturi element is centrally disposed in each of the carburetor barrels and separately designated by numerals 37, 38, 39, and 40. Each of the venturis has a fuel jet disposed therein, as seen at 42, 43, 44, and 45 respectively.

In Figure 3 are shown the linkage elements 46 and 47 which are actuated by the throttle linkage mechanism and connected therewith through the primary throttle valve shaft. Another linkage element is shown at 49 and is positively secured to the secondary throttle valve shaft, an end view of which is shown at 50. A spring 51 is connected to the element 49 and is effective to bias the shaft 50 and secondary throttle valves into a closed position.

In the bottom view shown in Figure 4, the throttle valves are clearly shown disposed in the downdraft end of the barrels 19 through 22 and are separately designated by numerals 52, 53, 54, and 55 respectively. The pair of valves 52 and 53, which are secured to the shaft 56, comprise the primary throttle valves and the remaining valves 54 and 55, which are secured to shaft 50, comprise the secondary throttle valves. A suitable linkage element 58, which forms a part of the throttle linkage mechanism, is positively connected to the primary throttle valve shaft 56 in a suitable manner.

Figure 5:
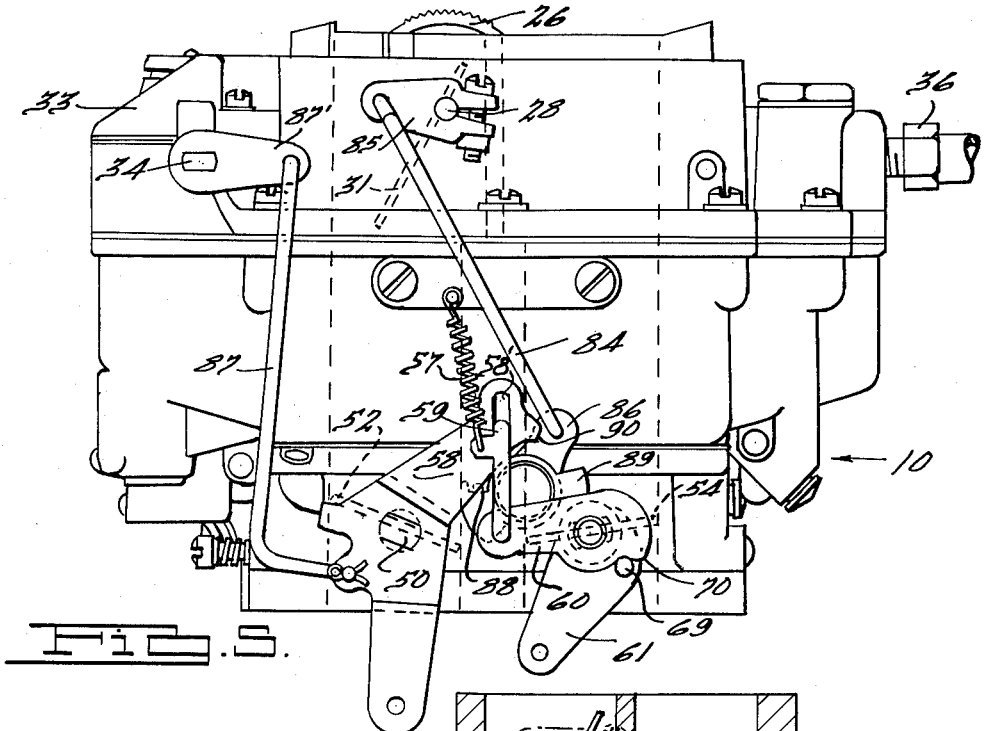
Figure 5 is a view of the carburetor showing the opposite side from that shown in Figure 3.
Figure 6:
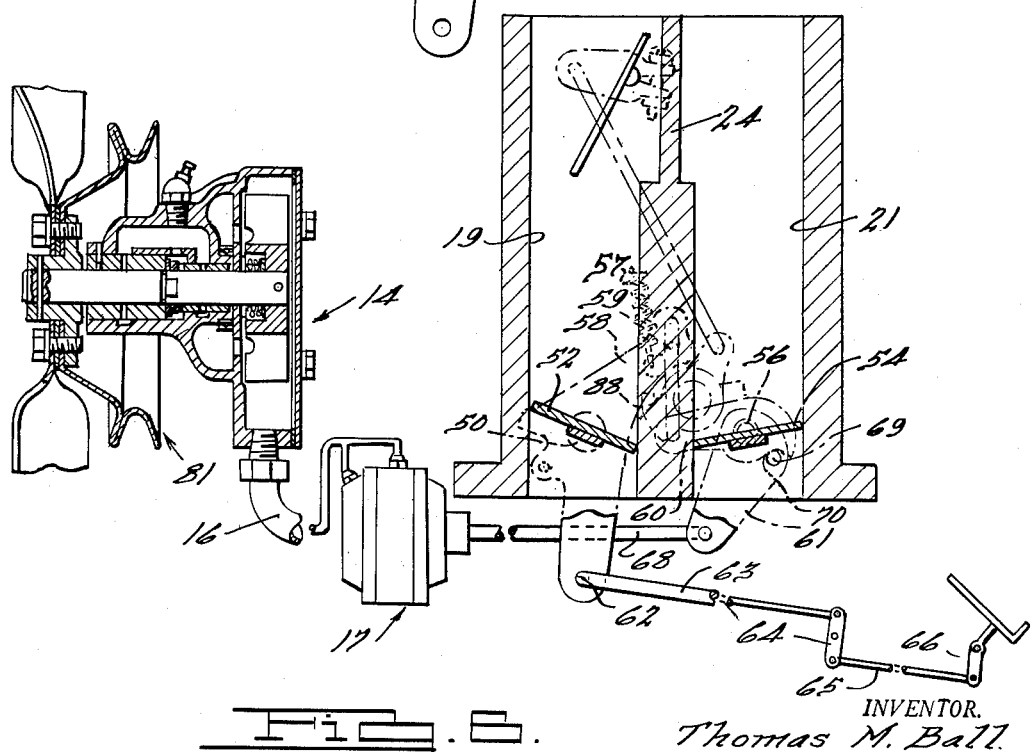
Figure 6 is a detailed sectional view of the throttle valve control linkage and the engine driven water pump showing also the water pump pressure actuator device.
Figure 7:
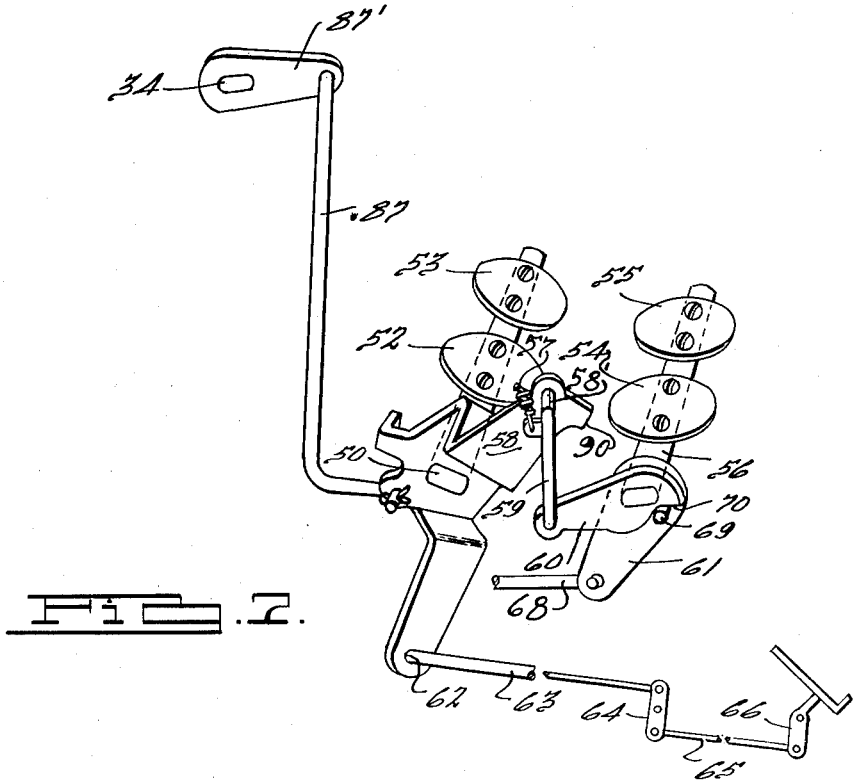
Figure 7 is a perspective view of the throttle valve control linkage.

In Figures 5, 6, and 7 the linkage elements, which are adapted to actuate the throttle valve shafts 50 and 56, are shown in detail and they comprise four principal components shown at 58, 59, 60, and 61. The linkage element 58 is secured to the primary throttle shaft 50, which carries the primary throttle valves, as previously explained, and is operatively connected at 62 to a throttle linkage mechanism which includes the elements 63, 64, 65, and 66.

The element 60 is rotatably secured to the secondary throttle shaft 56 and is linked to the element 58 by the link element 59. The element 58 is provided with an elongated slot 58' which provides a lost motion connection with the element 59. A spring 57 is secured at one end thereof to the element 59 and is fixed at the other end to the side of carburetor 10 as seen in Figure 5. The element 61 is fixedly secured to the secondary throttle shaft 56 and is connected at one end to a link element 68.

A protruding stop element is provided on element 61 at 69 and is adapted to engage a shoulder 70 formed on the element 60 thereby forming a lost motion connection between the elements 60 and 61.

Figure 8:
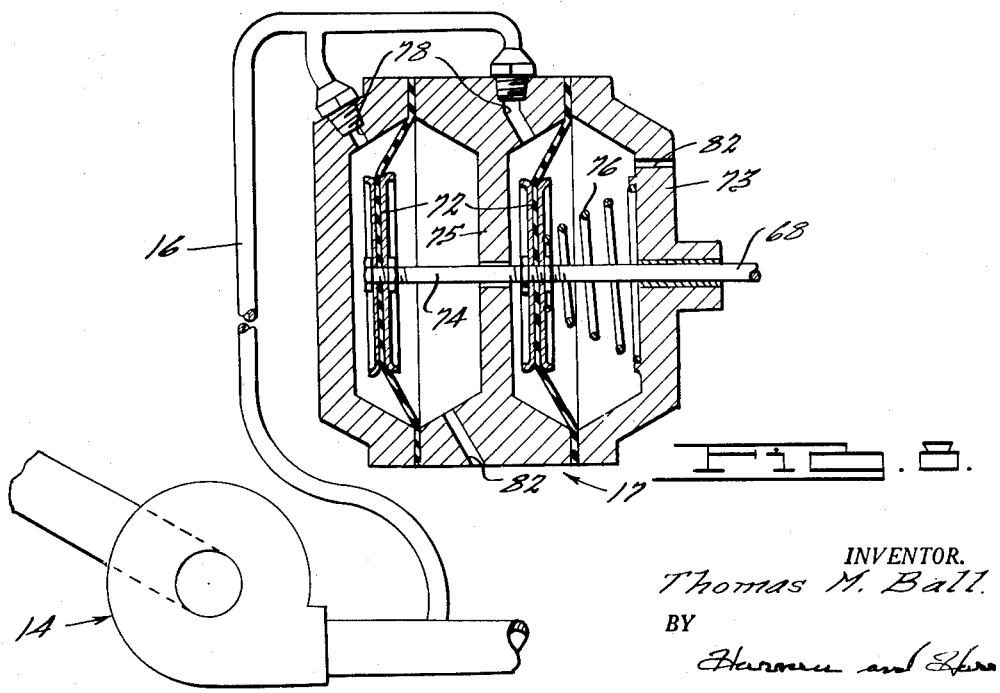
Figure 8 is a sectional view of the water pump pressure actuator device shown in Figure 6.

The link element 68 is extended to the pressure actuator device 17 which is shown in more particular detail in Figure 8. The element 68 is secured at one end to a pair of flexible diaphragms shown at 72. The diaphragms 72 are secured within a suitable housing 73 which is fixed in any convenient manner to the carburetor casting 25 or to the engine block. The diaphragms 72 are joined at their centers by a shaft 74 and are adapted to operate in tandem.

The housing 73 of the actuator device 71 includes a wall 75 which is formed between the two diaphragms 72 and which is centrally apertured to slidably receive the shaft 74. A spring 76 is interposed between a member 77 secured to the shaft 68 external of the housing 73 and is effective to bias the diaphragms and the link 68 outwardly.

The housing 73 includes water pump pressure passages 78 which are provided with suitable fittings for connecting the same to the suitable conduit 16 which in turn extends to a high pressure conduit on the outlet side of the water pump, shown generally at 14. The water pump 14 is driven in any conventional manner such as by the engine fan drive shown generally at 81 in Figure 6.

Vent means are provided in the housing 73 at 82 for allowing the air which is displaced by the moving diaphragms to pass therethrough.

The links 87 and 87', as seen in Figure 5, operatively connect the shaft 34 and the element 58 thereby transferring the throttle actuating motion from the throttle linkage mechanism to the shaft 34. As previously explained, the shaft 34 is adapted to control the metering jets and accelerator pumping mechanism within the portion 33 of the casting 25.

The link elements 84 and 85 operatively connect the choke valve shaft 28 with another link element 86 which is pivoted upon a portion of the casting 25. The element 86 is provided with a lost motion connection at 88 with an element 89 which is concentrically mounted with respect to element 86 on the casting 25. When the choke valve 31 is in the fully closed position, an abutment member 90 on the element 58 will contact the element 89 when the primary throttle valve approaches the wide open position thereby causing the element 89 to rotate clockwise a few degrees which in turn will cause the element 86 to turn clockwise by virtue of the lost motion connection at 88. The motion of element 86 is transferred to shaft 28 to "crack open" the choke valve 31.

The operation of this invention is as follows:

The primary throttle valve 52 is actuated in the usual manner by means of the throttle linkage 63, 64, 65, and 66. The opening of the primary throttle valve is accompanied by a clockwise movement of the link element 58. This movement causes the element 59 to move within the associated slot 58'. The spring 57 is effective to urge the secondary throttle valves 54 and 55 toward the closed position by virtue of the connection provided by the elements 59, 60, and 61. The clockwise turning moment imparted to element 60 causes the shoulder 70 to engage the stop member 69 thereby causing the element 61 and the integral throttle shaft 56 to rotate toward a closed throttle position.

When the element 58 and the primary throttle valves 52 and 53 are rotated to a predetermined angular position, the element 59 engages the end of slot 58'. When the lost motion connection between elements 58 and 59 is thus taken up, further rotation of the primary throttle valves 52 and 53 will cause the element 60 to rotate in a counterclockwise direction thereby disengaging the stop member 69 from shoulder 70.

If the engine speed is sufficiently great at this point, the diaphragm 72 will be caused to deflect to the right thus causing the secondary throttle valve 54 to open by virtue of the connection between the throttle valve shaft 56 and the diaphragms 72 through the elements 68 and 61.

When the engine speed is in the higher range and the primary throttle valve is only partly open, the lost motion connection between the member 69 and shoulder 70 will prevent the actuator device from moving the secondary throttle to the open position. Further, when the primary throttle is moved from the wide open position to a partly closed or fully closed position while the engine is operating at the higher speed range, the usual type of throttle return spring, not shown, will be effective to close both the primary and secondary throttle against the force applied to the secondary throttle linkage by the actuator device 17.

When the primary throttle valve is moved so that it approaches the wide open position while the engine is operating in the lower speed range, the water pump pressure is not sufficiently great to move the diaphragm 72 against the force exerted by the spring 76 and consequently the secondary throttle valve remains in the closed position. The spring 57 is effective to urge the secondary throttle valves into a closed position at all primary throttle settings less than the above mentioned predetermined angular position, and the spring 76 maintains the secondary throttle valves in a closed position at primary throttle settings above the predetermined position while the engine speed is in the lower speed range.

It is thus seen that the present invention is effective to open the second stage only when a high engine speed coincides with an open primary throttle setting and is also effective to maintain the second stage in a closed position when the engine is operating in the lower speed range or while operating in the higher speed range with a partly open primary throttle position. The response of the actuating device to the engine speed is of a positive character and is not affected by changes in the ambient atmospheric conditions.

While one specific embodiment of the invention has been disclosed, it is understood that the invention is not limited thereto since many variations may readily become apparent to those skilled in the art, and the invention is to be given its broadest possible interpretation within the scope of the following claims.

I claim:

1. In an internal combustion engine having an intake manifold and an engine coolant pressure source, at least two conduits for supplying a combustible mixture to said intake manifold, a throttle valve in each of said conduits, means for actuating one of said valves for controlling the passage of said combustible mixture through one of said conduit, and coolant pressure responsive means for independently actuating the valve in another of said conduits to supply an additional controlled charge of combustible mixture to said manifold during the operation of said engine within a predetermined speed range.

2. In an internal combustion engine having an intake manifold and an engine coolant pump, at least two conduits for supplying a combustible mixture to said intake manifold, a throttle valve in each of said conduits, means for actuating one of said valves for controlling the passage of said combustible mixture through said conduits, coolant pump pressure responsive means for actuating a second valve in another of said conduits to supply an additional controlled charge of combustible mixture to said manifold during the operation of said engine within a predetermined speed range, and control means for rendering said second valve substantially inoperative during the operation of said one valve within a predetermined range of operating positions of said one valve.

3. In an internal combustion engine having an intake manifold, an engine driven coolant pump, and at least two conduits for supplying a combustible mixture to said intake manifold, a throttle valve in each of said conduits, means for actuating one of said valves for controlling the passage of said combustible mixture through said conduits, other means for actuating a second valve in another said conduit comprising a pressure responsive actuating device operatively connected to said coolant pump through a pressure conduit, and linkage means operatively connecting said second valve with said actuating device.

4. In an internal combustion engine having an intake manifold, at least two conduits for supplying a combustible mixture to said manifold having an intake manifold and an engine driven coolant pump, a throttle valve in each of said conduits, means for actuating one of said valves for controlling the flow of said combustible mixture, other means for actuating a second valve in another of said conduits in response to engine speed to supply an additional control charge of combustible mixture to said manifold during the operation of said engine within the predetermined speed range, said other means comprising a pressure responsive actuating device operatively connected to said coolant pump through a pressure conduit, and linkage means operatively connecting said second valve and said actuating device.

5. A combination as set forth in claim 4 wherein said pressure responsive actuating device comprises a housing, a movable element mounted within said housing, and passage means for admitting coolant pressure from said conduits to one side of said element, said movable element being secured to said linkage means.

6. In combination with the intake manifold of an internal combustion engine having an engine coolant pressure source, a two-stage carburetor having at least two air intake throats for supplying a combustible mixture to said manifold, a primary throttle valve in one of said throats, a secondary throttle valve in another of said throats, means for adjusting the operative position of said primary throttle valve to control the flow of combustible mixture through said one throat, and means responsive to variations in engine coolant pressure for actuating the secondary throttle valve to control the passage of an auxiliary charge of combustible mixture through said other throat.

7. In combination with the intake manifold of an internal combustion engine having a liquid coolant pressure source, a two-stage carburetor having at least two intake throats for supplying a combustible mixture to said manifold, a primary throttle valve in one of said throats, a secondary throttle valve in another of said throats, a first means for adjusting the position of said primary throttle valve to control the flow of combustible mixture through said one throat, a coolant pressure responsive means for actuating the secondary throttle to control the passage of an auxiliary charge of combustible mixture through said other throat, and linkage means connecting portions of said first and said second means for maintaining the secondary throttle valve in a substantially closed position during a predetermined range of operating positions of said primary throttle valve.

8. In combination with the intake manifold of an internal combustion engine having thereon an engine driven coolant pump, a two-stage carburetor having at least two intake throats for supplying a combustible mixture to said manifold, a primary throttle valve in one of said throats, a secondary throttle valve in another of said throats, means for adjusting the operative position of said primary throttle valve to control the flow of combustible mixture through said one throat, and means responsive to engine coolant pump pressure for actuating the secondary throttle valve to control the passage of an auxiliary charge of combustible mixture through said other throat.

9. In an internal combustion engine having an intake manifold and an engine coolant pump, at least two throats for supplying a combustible mixture to said intake manifold, a throttle valve in each of said throats, a first means for actuating one of said valves for controlling the passage of said combustible mixture through one of said throats, and a second means for actuating a second throttle valve in another of said throats in response to engine coolant pump pressure to provide an additional supply of combustible mixture at engine speeds greater than a predetermined value.

10. The combination as set forth in claim 9 wherein said first and said second means include cooperating portions forming a lost motion connection therebetween, said lost motion connection being adapted to maintain said second throttle in a closed position during the operation of said one throttle valve within a predetermined range of operative positions and during the operation of said engine within a predetermined speed range.

11. In an internal combustion engine having an intake manifold and an engine coolant pump, at least two throats for supplying a combustible mixture to said intake manifold, a throttle valve in each of said throats, a first means for actuating one of said valves for controlling the passage of said combustible mixture through one of said throats, and a second means for actuating a second throttle valve in another of said throats in response to engine coolant pump pressure to provide an additional supply of combustible mixture at engine speeds greater than a predetermined value, said first and second means including cooperating portions forming a lost motion connection between said throttle valves, said lost motion connection being effective to permit said second throttle to remain in a closed position during the operation of said one valve within a predetermined range of operative positions and during the operation of said engine within a predetermined speed range.

12. In an internal combustion engine having an intake manifold, at least two conduits for supplying a combustible mixture to said intake manifold, a throttle valve in each of said conduits, means for actuating one of said valves for controlling the passage of said combustible mixture through said conduits, other means for actuating a second valve in another of said conduits in response to engine speed to supply an additional control charge of combustible mixture to said manifold during the operation of said engine within a predetermined speed range, and control means for rendering said second valve substantially inoperative during the operation of said one valve within a predetermined range of operating positions and during the operation of said engine within said predetermined speed range; said control means comprising a first linkage element secured to said one valve, a second linkage element secured to said second valve, a third linkage element pivotally mounted adjacent said second element and operatively connected to said first element by means of a first lost motion connection, and a second lost motion connection between said third and said second elements.

13. In combination with the intake manifold of an internal combustion engine, a two-stage carburetor having at least two intake throats for supplying a combustible mixture to said manifold, a primary throttle valve in one of said throats, a secondary throttle valve in another of said throats, a first means for adjusting the position of said primary throttle valve to control the flow of combustible mixture through said one throat, a second means responsive to engine speed for actuating the secondary throttle to control the passage of auxiliary charge of combustible mixture through said other throat, and a linkage means connecting portions of said first and said second means for maintaining the secondary throttle valve in a substantially closed position during a predetermined range of operating positions of said primary valve, said internal combustion engine including an engine driven coolant pump, and said second means including a pressure actuating device movable in response to engine coolant pump pressure operatively connected to said secondary throttle valve.

References Cited in the file of this patent

UNITED STATES PATENTS

| | | |
|---|---|---|
| 2,193,533 | Kishline et al. | Mar. 12, 1940 |
| 2,269,930 | Ericson et al. | Jan. 13, 1942 |
| 2,282,311 | Ericson et al. | May 12, 1942 |